United States Patent
Westerman

(10) Patent No.: US 10,919,440 B2
(45) Date of Patent: Feb. 16, 2021

(54) FLEXIBLE LIGHTING SYSTEM WITH CONDUCTIVE ADHESIVE BACKING FOR MOUNTING ON A GROUNDED SURFACE OF A VEHICLE

(71) Applicant: Paul Westerman, Hays, TX (US)

(72) Inventor: Paul Westerman, Hays, TX (US)

( * ) Notice: Subject to any disclaimer, the term of this patent is extended or adjusted under 35 U.S.C. 154(b) by 0 days.

(21) Appl. No.: 16/440,927

(22) Filed: Jun. 13, 2019

(65) Prior Publication Data

US 2019/0291634 A1  Sep. 26, 2019

Related U.S. Application Data

(63) Continuation of application No. 15/418,354, filed on Jan. 27, 2017, now Pat. No. 10,363,863.

(60) Provisional application No. 62/304,357, filed on Mar. 7, 2016.

(51) Int. Cl.
| | |
|---|---|
| *B60Q 1/26* | (2006.01) |
| *F21V 23/00* | (2015.01) |
| *F21S 4/22* | (2016.01) |
| *B60Q 1/00* | (2006.01) |
| *F21S 43/19* | (2018.01) |
| *F21S 43/14* | (2018.01) |
| *F21S 45/10* | (2018.01) |
| *B60Q 1/30* | (2006.01) |
| *F21Y 115/10* | (2016.01) |

(52) U.S. Cl.
CPC ......... *B60Q 1/2696* (2013.01); *B60Q 1/0088* (2013.01); *B60Q 1/2615* (2013.01); *F21S 4/22* (2016.01); *F21S 43/14* (2018.01); *F21S 43/19* (2018.01); *F21S 45/10* (2018.01); *F21V 23/001* (2013.01); *B60Q 1/305* (2013.01); *B60Q 2900/10* (2013.01); *F21Y 2115/10* (2016.08)

(58) Field of Classification Search
CPC .. B60Q 1/2696; B60Q 1/0088; B60Q 1/2615; B60Q 1/305; B60Q 2900/10; F21S 43/19; F21S 43/14; F21S 45/10; F21S 4/22; F21S 4/24; F21V 23/001; F21Y 2115/10; F21Y 2105/00; F21Y 2105/10; F21Y 2105/12; F21Y 2105/14; F21Y 2105/16; F21Y 2105/18

See application file for complete search history.

(56) References Cited

U.S. PATENT DOCUMENTS

| | | | | |
|---|---|---|---|---|
| 3,970,837 | A * | 7/1976 | Helm | B60Q 1/26 362/249.08 |
| 4,761,720 | A * | 8/1988 | Solow | F21V 21/0808 362/235 |
| 5,152,599 | A * | 10/1992 | Lewis | B60Q 1/2615 362/237 |
| 5,193,895 | A * | 3/1993 | Naruke | B60Q 1/323 362/249.01 |
| 6,505,963 | B1 * | 1/2003 | Chiang | B60Q 1/2696 362/245 |
| 6,520,669 | B1 * | 2/2003 | Chen | F21S 41/143 362/545 |

(Continued)

*Primary Examiner* — Erin Kryukova
(74) *Attorney, Agent, or Firm* — Pierson Intellectual Property LLC

(57) ABSTRACT

Embodiments disclose systems and methods associated with flexible lights. More particularly, embodiments relate to flexible lights with a conductive adhesive backing layer and a durable rubber layer, wherein LEDs are embedded into the durable rubber layer.

12 Claims, 2 Drawing Sheets

(56) References Cited

U.S. PATENT DOCUMENTS

| | | | | |
|---|---|---|---|---|
| 6,761,472 B1* | 6/2004 | Cleaver et al. | ............ | F21S 4/22 |
| | | | | 362/267 |
| 6,866,394 B1* | 3/2005 | Hutchins | ................. | E01F 9/582 |
| | | | | 362/192 |
| 7,316,494 B2* | 1/2008 | Eichhorn | .............. | F21S 41/153 |
| | | | | 362/545 |
| 8,641,229 B2* | 2/2014 | Li | ............................. | F21S 4/28 |
| | | | | 362/219 |
| 10,219,570 B2* | 3/2019 | Scott | ....................... | A42B 3/044 |
| 2004/0223328 A1* | 11/2004 | Lee | ........................... | F21S 4/22 |
| | | | | 362/249.01 |
| 2008/0253140 A1* | 10/2008 | Fleischmann | ......... | B60Q 1/2696 |
| | | | | 362/487 |
| 2017/0254518 A1* | 9/2017 | Vasylyev | .............. | F21V 17/007 |

\* cited by examiner

FLEXIBLE LIGHTING SYSTEM WITH CONDUCTIVE ADHESIVE BACKING FOR MOUNTING ON A GROUNDED SURFACE OF A VEHICLE

CROSS-REFERENCE TO RELATED APPLICATIONS

This application claims a benefit of priority under 35 U.S.C. § 119 to Provisional Application No. 62/304,357 filed on Mar. 7, 2016, which is fully incorporated herein by reference in its entirety.

BACKGROUND INFORMATION

Field of the Disclosure

Examples of the present disclosure are related to systems and methods for flexible lights. More particularly, embodiments relate to flexible lights with a conductive adhesive backing layer and a durable rubber layer, wherein light emitting diodes (LEDs) are embedded within the durable rubber layer.

Background

Generally, a trailer is an unpowered vehicle towed by a powered vehicle. Trailers are used for a variety of purposes. For example, trailers are used to transport goods, habitation, transport vehicles, etc. A trailer typically has a shared lighting system with the powered vehicle, such that when the powered vehicle's lights are enabled, the corresponding lights on the trailer are enabled.

However, lights on trailers generally break or crack easily. These broken lights can be difficult to replace and require mounting onto the trailer. Even if one were to replace the lights on trailers, the quality of replacement lights is poor. These replacement lights are generally made of hard fragile plastic with a single bulb. If the single bulb on the replacement light breaks, it is required to once again replace the lights on the trailer. Replacing a light on a trailer while traveling long distances can be a hazard and an annoying task to complete.

Accordingly, needs exist for more effective and efficient systems and methods for flexible lights configured to be coupled to an outer surface of a vehicle without requiring the lights to be mounted within the vehicle.

SUMMARY

Embodiments disclose systems and methods associated with flexible lights. More particularly, embodiments relate to flexible lights with a conductive adhesive backing layer and a durable rubber layer, wherein LEDs are embedded into the durable rubber layer. The LEDs may be positioned in parallel to each other, and receive power from a single wire extending from a sidewall of the durable rubber layer, and be grounded via internal wiring within the durable rubber layer and the conductive adhesive backing. The flexible lights may be configured to be bent, curved, folded, etc. and adhere to an external surface, such as an external surface of a vehicle or trailer.

Embodiments may include a first power input, the durable rubber layer, and the conductive adhesive backing layer.

The first power input may be configured to be coupled with wiring within the durable rubber layer and an external power supply. In embodiments, the external power supply may be a battery of a vehicle. Additionally, the first power input may also be configured to be coupled with the lights of the powered vehicle. Thus, when a corresponding light of the powered vehicle is enabled, a corresponding flexible light may be enabled.

The durable rubber layer may be comprised of flexible polymers that may act as an insulator for power supplied to the flexible lights. The durable rubber layer may include internal wiring and a plurality of lights. The internal wiring may include a plurality of interconnected rows and/or columns of wires. The interconnected wires may be electrically coupled to the power source and the conductive adhesive backing. Each row of each column may include an LED. The LEDs may be embedded within the durable rubber layer such that a bottom surface of an LED is positioned above the bottom surface of the durable rubber layer, and a top surface of the LED is positioned below the top surface of the durable rubber layer. Therefore, each of the LEDs may be fully encompassed by the durable rubber layer.

By having a plurality of LEDs in parallel to each other embedded within the durable rubber layer, the flexible lights will be fault tolerant. Thus, the flexible lights may be operable even if one or two of the embedded LEDs is inoperable. Additionally, the durable rubber layer may reduce impact from objects striking the embedded LEDs.

The conductive adhesive backing layer may be a pressure sensitive adhesive with isotropic electricity conductivity. The conductive adhesive backing layer may be configured to adhere to a surface while allowing for an interconnection between various types of substrates. The conductive adhesive wiring may be positioned under an entirety of the durable rubber layer. The conductive adhesive backing layer may be coupled with the interconnected rows and columns of the wiring within the durable rubber layer. In embodiments, the conductive adhesive backing layer may be configured to adhere to an exterior surface of a trailer, which may be grounded. Through the grounded, conductive adhesive backing, the LEDs embedded within the durable rubber layer may be constantly grounded without needed an extra, external wire.

To this end, the flexible light system may only need a single exposed wire to couple with the vehicle's power source to operate. Furthermore, because the conductive adhesive backing layer may adhere to an external surface of the trailer, it may not be required to bolt or mount the flexible lighting system onto the trailer.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Figure 1:
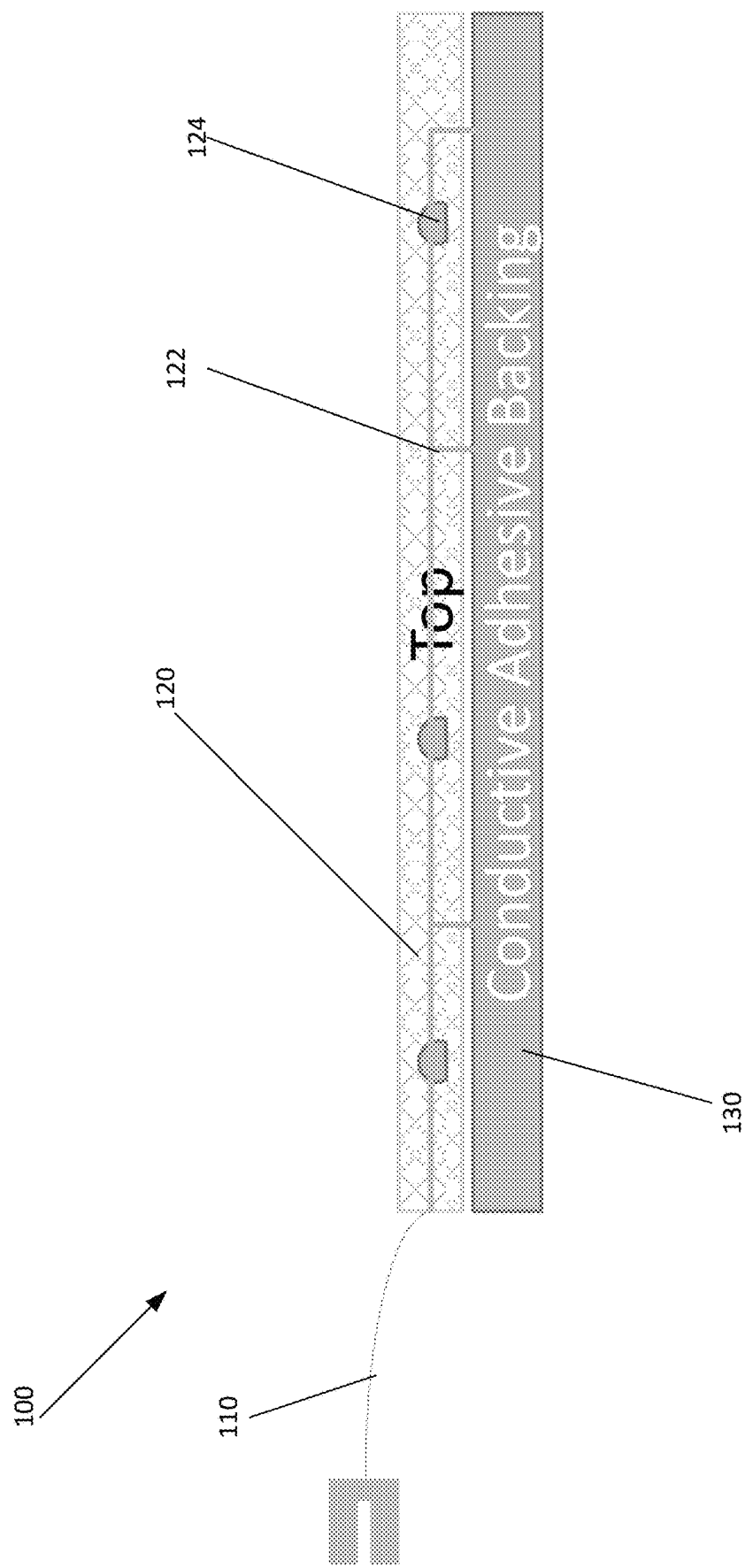
FIG. 1 depicts an embodiment of flexible light system, according to an embodiment.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present disclosure. Also, common but well-understood elements that are useful or necessary in a commercially feasible embodiment are often not depicted in order to facilitate a less obstructed view of these various embodiments of the present disclosure.

DETAILED DESCRIPTION

In the following description, numerous specific details are set forth in order to provide a thorough understanding of the present embodiments. It will be apparent, however, to one having ordinary skill in the art that the specific detail need not be employed to practice the present embodiments. In other instances, well-known materials or methods have not been described in detail in order to avoid obscuring the present embodiments.

Embodiments disclose systems and methods associated with flexible lights. More particularly, embodiments relate to flexible lights with a conductive adhesive backing layer and a durable rubber layer, wherein LEDs are embedded into the durable rubber layer.

Turning now to FIG. 1, FIG. 1 depicts an embodiment of flexible light system 100. Flexible light system 100 may be comprised of pliable materials with embedded LEDs, wherein flexible light system 100 is configured to be adhered to an exterior surface of a trailer. Flexible light system 100 may include a first power input 110, conductive adhesive backing/layer 130, and durable rubber layer 120.

First power input 110 may be electrical wiring configured to receive power from an external power source, such as the external power supply of a powered vehicle. The external power source may be configured to power the flexible light system. First power input 110 may be configured to be coupled with wiring within the durable rubber layer 120 and the external power supply. First power input 110 may also be configured to be coupled with the lights of the powered vehicle, such that when a corresponding light of the powered vehicle is enabled, lights within the flexible light system may also be enabled. In embodiments, first power input 110 may be coupled to a single edge or sidewall of durable rubber layer 120, wherein first power input 110 is connected to internal wiring 122 at a position below the top surface of durable rubber layer 120. This may minimize the amount of exposed wiring caused by first power input 110. In embodiments, first power input 110 may be configured to couple with a positive connection of an external power source via a simple hand clamp.

Durable rubber layer 120 may be comprised of flexible polymers that may act as an insulator for electricity flowing through flexible light system 100. Durable rubber layer 120 may be comprised of non-conductive material. Durable rubber layer 120 may be configured to be positioned away from an exterior surface of a trailer or vehicle, such that durable rubber layer 120 is not directly positioned against the trailer or vehicle. Durable rubber layer 120 may be configured to be positioned directly adjacent to conductive adhesive backing layer 130.

Durable rubber layer 120 may include internal wiring 122 and a plurality of lights 124. Internal wiring 122 may include a plurality of interconnected rows and/or columns of wires embedded within durable rubber layer, such that internal wiring is not exposed to the elements. Interconnected wires 122 may be electrically coupled to the power source via first power input 110 and conductive adhesive backing 130.

Each row of each column may include an LED 124 or multiple LEDs. The LEDs 124 may be embedded within durable rubber layer 120, such that a bottom surface of an LED 124 is positioned above the bottom surface of durable rubber layer 120, and a top surface of the LED 124 is positioned below the top surface of durable rubber layer 120. By having a plurality of LEDs 124 embedded within durable rubber layer 120 positioned in parallel to each other, flexible light system 100 may be fault tolerant, wherein flexible light system 100 may be operable even if one or more of the embedded LEDs 124 is inoperable.

Conductive adhesive backing layer 130 may be a pressure sensitive adhesive with isotropic electricity conductivity. Conductive adhesive backing layer 130 may be configured to be positioned directly underneath durable rubber layer 120. Conductive adhesive backing layer 130 may have substantially the same height, width, and length as durable rubber layer 120. Conductive adhesive backing layer 130 may be configured to adhere to a surface allow for an interconnection between various types of substrates. For example, conductive adhesive backing layer 130 may be configured to be positioned on an exterior surface of a trailer. In embodiments, conductive adhesive backing layer 130 may have a removable peel and stick layer positioned underneath conductive adhesive backing layer 130. Responsive to removing the peel and stick layer, conductive adhesive backing layer 130 may be adhered to a surface. When conductive adhesive backing layer 130 is adhered to the trailer or vehicle, the total surface area of conductive adhesive backing layer 130 may be grounded.

Conductive adhesive backing layer 130 may be comprised of a flexible material that includes materials that may adhere to surfaces while maintaining conductive. Internal wiring 122 may be configured to extend through durable rubber layer 120 and contact conductive adhesive backing layer 130 to complete a circuit. As such, internal wiring 122 may traverse a boundary between durable rubber layer 120 and conductive adhesive backing 130 to form a circuit. The internal wiring 122 may extend from conductive adhesive backing 130 to the circuit in a position that is between LEDs 130. Accordingly, each separate row of internal wiring 122 may be directly coupled to ground via conductive adhesive backing 130. In embodiments, the conductive adhesive backing layer 130 may be configured to adhere to a grounded surface. Therefore, an electrical circuit formed by system 100 may only require a single external wire 110 for power, while the circuit is grounded via interconnected wires 122 and conductive adhesive backing layer 130.

Figure 2:
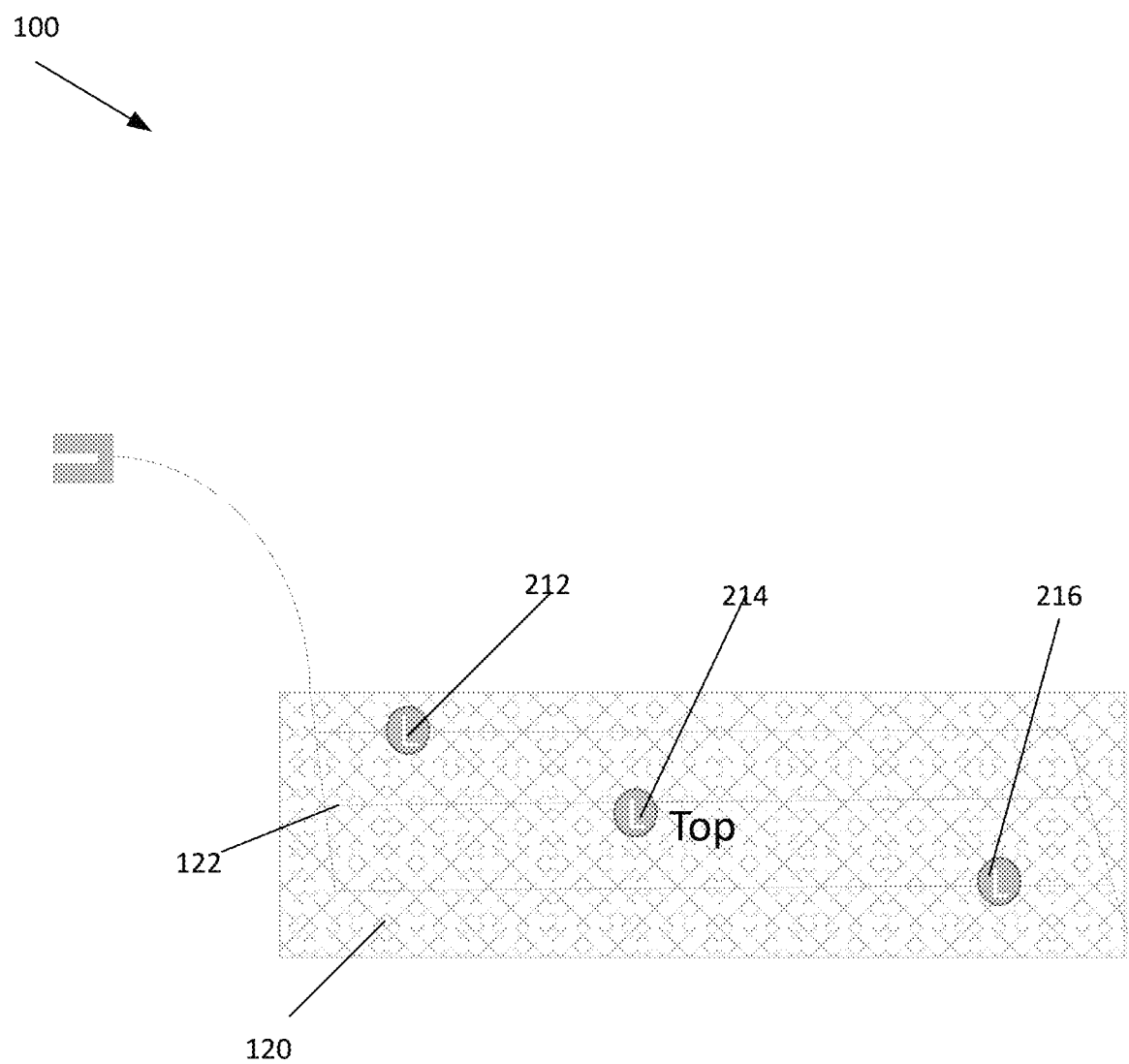
FIG. 2 depicts a top view of flexible light system, according to an embodiment.

FIG. 2 depicts a top view of flexible light system 100. Elements depicted in FIG. 2 may be substantially the same as those described above. For the sake of brevity, a further description of these items is omitted.

As depicted In FIG. 2, a plurality of LEDs 212, 214, 216 may be embedded within durable rubber layer 120. By having a plurality of LEDs 212, 214, 216 if a single LED is rendered inoperable, flexible light system 100 may still have other operable LEDs, and thus be functional. Furthermore, as depicted in FIG. 2, the plurality of LEDs 212, 214, 216 may be arranged in a series and may be horizontally and vertically offset from each other. Accordingly, if an external object contacts flexible light system 100 it is less likely that the object damages each and every LED 212, 214, 216.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or sub-combinations in one or more embodiments or examples. In addition, it is appreciated that the figures provided herewith are for explanation purposes to persons ordinarily skilled in the art and that the drawings are not necessarily drawn to scale.

The flowcharts and block diagrams in the flow diagrams illustrate the architecture, functionality, and operation of possible implementations of systems, methods, and computer program products according to various embodiments of the present invention. In this regard, each block in the flowcharts or block diagrams may represent a module, segment, or portion of code, which comprises one or more executable instructions for implementing the specified logical function(s).

The invention claimed is:

1. A flexible lighting system configured to be mounted on a grounded surface of a vehicle, the flexible lighting system comprising:
   a first layer with an upper surface and a lower surface, wherein the first layer is formed of rubber;
   a plurality of light emitting diodes including a first light emitting diode and a second light emitting diode;
   a second layer positioned adjacent to the lower surface of the first layer, wherein the second layer is comprised of adhesive and conductive materials, internal wiring with a plurality of rows and a plurality of columns embedded within the first layer to couple the first light emitting diode and the second light emitting diode in parallel, wherein the plurality of rows extend extends in a first horizontal direction, and the plurality of columns in a first vertical direction that extends vertically from the first layer to the second layer, the first vertical wire and the second vertical wire extend along the first vertical direction from the first layer into the second layer.

2. The system of claim 1, wherein the first light emitting diode is positioned on a first axis offset from the second light emitting diode positioned on a second axis.

3. The system of claim 2, wherein the plurality of columns includes a first vertical wire and a second vertical wire, the first vertical wire being positioned in the first horizontal direction between the first light and the second light, the second vertical wire being positioned in the first horizontal direction.

4. The system of claim 1, wherein the first layer is positioned directly over the second layer.

5. The system of claim 4, wherein the second layer is configured to be directly coupled to the grounded surface of the vehicle.

6. The system of claim 1, further comprising:
   a power input comprised of a single wire configured to supply power to the internal wiring.

7. A method for mounting a flexible lighting system on a grounded surface of a vehicle comprising:
   embedding a plurality of light emitting diodes including a first light emitting diode and a second light emitting diode within a first layer, the first layer including an upper surface and a lower surface, wherein the first layer is formed of rubber;
   forming internal wiring with a plurality of rows and a plurality of columns embedded within the first layer to couple the first light emitting diode and the second light emitting diode in parallel, wherein the plurality of rows in a first horizontal direction, and the plurality of columns extend in a first vertical direction that extends vertically from the first layer to the second layer, wherein the second layer is comprised of adhesive and conductive materials, the first vertical wire and the second vertical wire extend along the first vertical direction from the first layer into the second layer.

8. The method of claim 7, further comprising:
   positioning the first light emitting diode along a first axis;
   positioning the second light emitting diode on a second axis.

9. The method of claim 8, wherein the plurality of columns includes a first vertical wire and a second vertical wire, the first vertical wire being positioned in the first horizontal direction between the first light and the second light, the second vertical wire being positioned in the first horizontal direction.

10. The method of claim 7, further comprising:
    directly positioning the first layer over the second layer.

11. The method of claim 10, further comprising:
    directly coupling the second layer to the grounded surface of the vehicle.

12. The method of claim 7, further comprising:
    supplying power to the internal wiring via a power input comprised of a single wire.

* * * * *